US006944540B2

(12) United States Patent
King et al.

(10) Patent No.: US 6,944,540 B2
(45) Date of Patent: Sep. 13, 2005

(54) TIME DETERMINATION IN SATELLITE POSITIONING SYSTEM RECEIVERS AND METHODS THEREFOR

(75) Inventors: Thomas Michael King, Tempe, AZ (US); George Jeffrey Geier, Scottsdale, AZ (US); Rodney Patrick Landers, Grayslake, IL (US); Michael Joseph Slade, Libertyville, IL (US); Paul DeClerck, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 382 days.

(21) Appl. No.: 10/108,409

(22) Filed: Mar. 28, 2002

(65) Prior Publication Data

US 2003/0187575 A1 Oct. 2, 2003

(51) Int. Cl.$^7$ ............................................... G01C 21/26
(52) U.S. Cl. .................. 701/213; 342/357.12; 342/358; 701/214
(58) Field of Search ................................. 701/214, 213, 701/208; 342/357.1, 357.06, 357.09, 357.05, 357.12, 357.13

(56) References Cited

U.S. PATENT DOCUMENTS

| | | | |
|---|---|---|---|
| 4,114,155 A | 9/1978 | Raab .......................... 342/394 |
| 4,164,036 A | 8/1979 | Wax ............................ 702/74 |
| 4,291,409 A | 9/1981 | Weinberg ................... 375/347 |
| 4,426,712 A | 1/1984 | Gorski-Popiel ............. 375/343 |
| 4,870,422 A | 9/1989 | Counselman .......... 342/357.12 |
| 5,043,736 A | 8/1991 | Darnell ..................... 342/357.1 |
| 5,194,871 A | 3/1993 | Counselman .......... 342/357.08 |
| 5,343,209 A | 8/1994 | Sennott ................. 342/357.02 |
| 5,365,450 A | 11/1994 | Schuchman .............. 455/456.3 |
| 5,384,574 A | 1/1995 | Counselman .......... 342/357.12 |
| 5,663,734 A | 9/1997 | Krasner ................. 342/357.12 |
| 5,663,735 A | 9/1997 | Eshenbach |
| 5,812,087 A | 9/1998 | Krasner .................... 342/357.1 |
| 5,815,538 A * | 9/1998 | Grell et al. ................. 375/356 |
| 5,825,887 A * | 10/1998 | Lennen ......................... 380/34 |
| 5,841,396 A | 11/1998 | Krasner ................. 342/357.02 |
| 5,893,044 A | 4/1999 | King et al. ................. 701/214 |
| 5,917,444 A | 6/1999 | Loomis ................. 342/357.12 |
| 5,945,944 A | 8/1999 | Krasner ................. 342/357.06 |
| 5,982,324 A | 11/1999 | Watters ................. 342/357.06 |
| 6,002,363 A | 12/1999 | Krasner ...................... 324/754 |
| 6,041,222 A | 3/2000 | Horton ........................ 455/255 |
| 6,061,018 A | 5/2000 | Sheynblat .............. 342/357.06 |
| 6,064,336 A | 5/2000 | Krasner ................. 342/357.05 |
| 6,088,348 A | 7/2000 | Bell ........................... 370/343 |
| 6,097,974 A | 8/2000 | Camp ....................... 455/575.7 |

(Continued)

OTHER PUBLICATIONS

Robert P. Denaro, Navstar GPS Test Results and Eric J. Hoffman, et al.; GPSPAC: A Spaceborne GPS Navigation Set; IEEE Plans 1978 Position Location and Navigation Symposium; Nov. 6–9, 1978; which includes the title page, Table of Contents, pp. 1–6 and pp. 13–20.

(Continued)

*Primary Examiner*—Marthe Y. Marc-Coleman
(74) *Attorney, Agent, or Firm*—Ronald K. Bowler, II

(57) ABSTRACT

Method in a Global Positioning System (GPS) receivers, including determining pseudorange (PNR) measurements for at least four satellites (210), determining a coarse time (220) corresponding to the pseudorange measurement, determining an offset time (240) between a periodic GPS event of one of the four satellites and the coarse time, determining a time correction delta (250) based upon the period of the Periodic GPS event, the offset time and the coarse time if an error of the coarse time is less than ½ the period of the periodic GPS event, and determining corrected time (260) based upon the coarse time and the time correction delta if the error of the coarse time is less than ½ the period of the periodic GPS event.

54 Claims, 8 Drawing Sheets

U.S. PATENT DOCUMENTS

| | | | | |
|---|---|---|---|---|
| 6,107,960 | A | 8/2000 | Krasner | 342/357.09 |
| 6,111,540 | A | 8/2000 | Krasner | 342/357.1 |
| 6,121,923 | A | 9/2000 | King | 342/357.12 |
| 6,122,506 | A | 9/2000 | Lau | 455/427 |
| 6,133,871 | A | 10/2000 | Krasner | 372/357.06 |
| 6,133,873 | A | 10/2000 | Krasner | 342/357.12 |
| 6,133,874 | A | 10/2000 | Krasner | 342/357.15 |
| 6,191,731 | B1 | 2/2001 | McBurney et al. | |
| 6,208,290 | B1 | 3/2001 | Krasner | |
| 6,208,292 | B1 | 3/2001 | Sih | 342/357.12 |
| 6,236,354 | B1 | 5/2001 | Krasner | 342/357.06 |
| 6,295,024 | B1 | 9/2001 | King et al. | 342/357.12 |
| 6,323,804 | B1 | 11/2001 | Kurby et al. | 342/357.06 |
| 6,346,911 | B1 | 2/2002 | King | 342/357.06 |
| 6,389,291 | B1 | 5/2002 | Pande et al. | |
| 6,421,002 | B2 | 7/2002 | Krasner | |
| 6,427,120 | B1 | 7/2002 | Garin et al. | |
| 6,429,809 | B1 | 8/2002 | Vayanos et al. | |
| 2003/0016166 | A1 * | 1/2003 | Jandrell | 342/357.1 |

OTHER PUBLICATIONS

M. J. Bordel, et al., Texas Instruments Phase I GPS User Equipment; The Institute of Navigation, Global Positioning System; vol. 1, pp. 87–102.

Larry L. Horowitz, Analysis Of A Single–Bit Digital Receiver For Carrier And Code Tracking; The Johns Hopkins University—Applied Physics Laboratory; Jul. 1976, pp. 5–139.

B. G. Glazer, GPS Receiver Operation; Navigation Journal of the Institute of Navigation; vol. 25, No. 2, Spring 1978; pp. 173–178.

Charles C. Counselman III et al., Miniature Interferometer Terminals For Earth Surveying; Massachusetts Institute of Technology; pp. 139–163.

Charles C. Counselman III et al., Miniature Interferometer Terminals For Earth Surveying; Massachusetts Institute of Technology; pp. 65–85.

Charles C. Counselman III et al., Miniature Interferometer Terminals For Earth Surveying: Ambiguity and Multipath with Global Positioning System; IEEE Transactions on Geoscience and Remote Sensing; vol. GE–19, No. 4, Oct. 1981, pp. 244–252.

Charles C. Counselman III et al., The Macrometer: A Compact Radio Interferometry Terminal For Geodesy With GPS; Macrometrics, Inc.; pp. 1165–1172.

T. Thompson, Performance Of The Satrack/Global Positioning System Trident I Missile Tracking System; The Johns Hopkins University, Applied Physics Laboratory; 1980 IEEE; pp. 445–449.

Mikko Kokkonen, et al., A New Bit Synchronization Method for a GPS Receiver; 2002 IEEE; pp. 85–90.

Charles C. Counselman III et al., Accuracy of Baseline Determinations By Mites Assessed By Comparison With Tape, Theodolite and Geodimeter Measurements; EOS; vol. 62, No. 17; Apr. 28, 1981; p. 260.

Harry Valio, LMU Less Assisted GPS Solution, Jan. 25, 2000, 11 pages.

James J. Spilker, Jr., Global Positioning System: Theory and Applications, vol. I, pp. 395–396.

J.J. Spilker, Jr., Digital Communications by Satellite, pp. 431–449.

ARINC Research Corporation, Navstar GPS Space Segment/Navigation User Interfaces (ICD–GPS–200), Oct. 10, 1993, pp. 1–138.

* cited by examiner

TIME DETERMINATION IN SATELLITE POSITIONING SYSTEM RECEIVERS AND METHODS THEREFOR

FIELD OF THE INVENTIONS

The present inventions relate generally to satellite positioning system receivers, and more particularly to time determination in satellite positioning system receivers, for example in Global Positioning System (GPS) enabled cellular radio communication handsets, and methods therefor.

BACKGROUND OF THE INVENTIONS

The Global Positioning System (GPS) is a satellite-based system developed by the United States Department of Defense to provide accurate positional information to a GPS receiver anywhere on earth, including its altitude. The GPS system comprises a constellation of 24 or more earth orbiting satellites in 12-hour orbits. The satellites are arranged in six orbital planes, each containing four satellites, spaced sixty degrees apart and inclined approximately fifty-five degrees from the equatorial plane. The constellation configuration ensures that between four and twelve satellites are visible at any time at any location on earth with a clear view of the sky. A properly equipped GPS receiver typically yields positional coordinates in three dimensions.

The GPS satellite signal includes a carrier signal that is bi-phase modulated with a 1023 bit long Gold spreading code at a 1.023 MHz chip rate, corresponding to a 0.001 second repeat interval. The carrier signal also includes a navigation data message modulated at 50 bits per second (BPS) (transmitted at a rate of twenty milliseconds per data bit). The navigation data message includes GPS satellite data, including satellite position (ephemeris) data and satellite clock correction data, for use by GPS receivers, and information for determining GPS time (i.e., a clock time of the GPS satellite) and information for determining geographical location.

Precise time is required for accurate GPS positioning. An accurate estimate of satellite position associated with several corresponding pseudorange measurements is required to derive an accurate position estimate, and knowledge of the signal transit time between the GPS receiver and each satellite is required to determine the pseudorange measurements. In order to predict satellite positions on the order of one meter, for example, time must be acquired to an accuracy of 1 millisecond, since peak range rates attributable to satellite motion are roughly 1 km/sec. Without accurate time information, GPS receiver code phase measurements are ambiguous since they represent only a fractional portion of the pseudorange measurements within 1 millisecond, which is the period of the GPS commercial pseudo random code.

The clock time included in the GPS message is an absolute time signal that is precisely synchronized at the satellite. Particularly, all satellites in the GPS constellation are synchronized by ground reference stations, which precisely control the absolute time error of the satellites on the order of several nanoseconds.

The absolute GPS time signal may be used by GPS receivers to accurately determine time and position. Once position is known approximately, the absolute time in the GPS receiver can be determined by offsetting the precise time observed by the GPS receiver in the satellite broadcast message by the computable propagation delay between the receiver and the satellite. It is thus desirable for GPS receivers to be able to obtain accurate time measurements.

GPS receivers cannot always reliably determine a local time from the GPS satellite broadcast navigation data message. Due to their portable nature, such GPS receivers, for example, those incorporated in cellular telephones and handheld devices, are often used in vehicles traveling in urban canyons and in buildings and in other environments that obstruct or significantly degrade the satellite signals. In these environments, reception of the 50 BPS absolute time signal of the navigation data message is unreliable.

A Time Of Week (TOW) data field included in the 50 BPS navigation data message, in conjunction with the absolute time signal, allows GPS receivers to accurately and reliably determine local time. The TOW data is transmitted by all satellites at six-second intervals. Detection of the TOW data is dependent on signal magnitude. Below a certain signal magnitude level it is possible to obtain a range measurement, but it is not possible to decode the TOW data. For example, at signal levels below approximately 30 dB-Hz, it is nearly impossible to decode individual message bits of the 50 BPS message. It is possible, however, to obtain signal correlation at signals substantially below 30 dB-Hz, perhaps below 20 dB-Hz. Not only is it desirable to obtain accurate time in GPS receivers, it is also desirable to determine time accurately in weak signal environments, for example at signal levels below 30 dB-Hz.

U.S. Pat. No. 5,945,944 entitled "Method And Apparatus For Determining Time For GPS Receivers" discloses the establishment of GPS time in a wireless communications handset by demodulation of signals received from cellular communications infrastructure.

U.S. Pat. No. 5,812,087 entitled "Method And Apparatus For Satellite Positioning System Based Time Measurement" discloses determining GPS time by comparing portions of satellite navigation data messages overlapping in time, but this scheme is usable only where time is in error by at most a few seconds.

U.S. Pat. No. 6,346,911 entitled "Method and Apparatus For Determining Time in a GPS Receiver" discloses a method of measuring the time of arrival of a predicted sequence of bits by a data correlation method, the time associated with the predicted sequence of bits being known.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
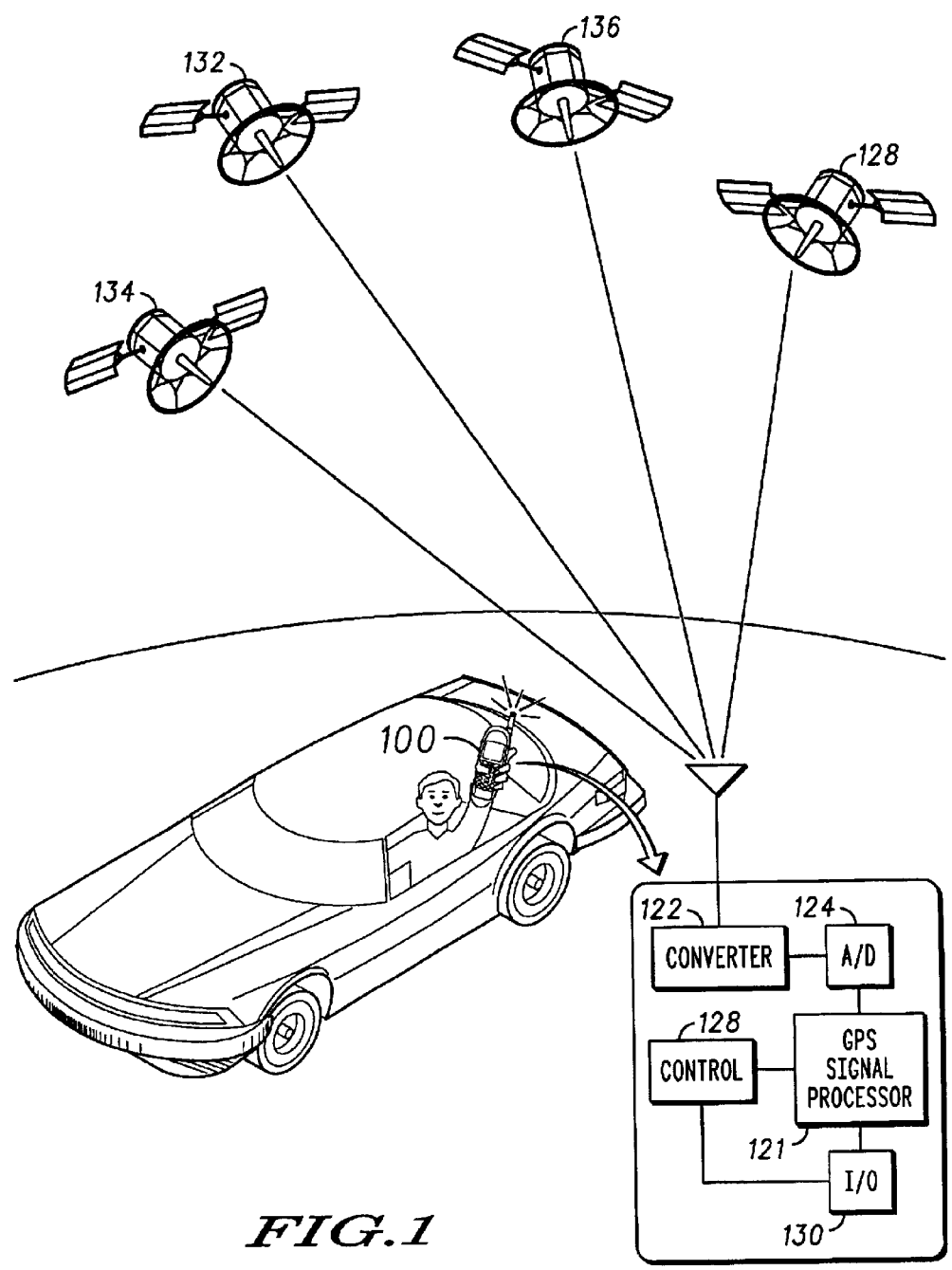
FIG. 1 is an exemplary mobile GPS receiver handset.

FIG. 1 illustrates a mobile satellite positioning system receiver, for example a GPS receiver integrated with a wireless cellular communications handset 100. FIG. 1 also illustrates a schematic block diagram of the exemplary GPS receiver portion 120 of the handset for receiving satellite signals from satellites 132, 134, 136 and 138 in a constellation of earth orbiting satellites.

In FIG. 1, the GPS receiver comprises generally a down converter 122 coupled to a GPS antenna, an analog to digital converter 124, a GPS signal processor 126 having a pseudorandom (PN) code phase and Doppler search space architecture, a controller 128 and an input/output (I/O) block 130 representative of a user interface, wireless communications circuitry interface, and other input and input/output ports. In other embodiments, the GPS receiver may be a stand-alone device, or it may be integrated with some other equipment.

In the present invention, time is determined generally by synchronizing a satellite positioning system receiver with a periodic GPS event of a signal transmitted by a GPS satellite (SV), and then by computing time based on a coarse time or on an improved coarse time derived from an over-determined navigation time solution, depending upon the accuracy of the coarse time, as discussed more fully below. The method takes advantage of the fact that every bit or combination of bits of the GPS navigation data message signal are associated with a time that is ambiguous at some periodic interval.

The error in the coarse time (or improved coarse time) impacts the pseudo range (PR) through the motion of the GPS satellite, i.e., an error in knowledge of GPS time of magnitude $\Delta t$ impacts the PR residual (the PR minus the estimated range to the satellite) as given in Eq. (1) below:

$$PR_{res} = v_r \Delta t + a_r \Delta t^2 / 2 +$$  Eq. (1)

where $v_r$ is the satellite range rate, and $a_r$ is the satellite range acceleration.

The Eq. (1) has an infinite number of terms for $\Delta t$ of arbitrary magnitude. It is desirable, therefore, to limit the number of terms to facilitate the solution for $\Delta t$. In particular, if all terms higher than the first order term in $\Delta t$ can be assumed small, then Eq. (1) expresses a linear relationship between the PR residual and the unknown error component $\Delta t$. GPS satellite range accelerations peak at about 0.2 meters/sec$^2$, and higher derivatives are equally small. This establishes a so-called "linear range" for the time solution, i.e., a range of $\Delta t$ magnitudes for which the relationship expressed in Eq. (1) can be assumed linear, i.e., all terms of higher order in $\Delta t$ can be ignored.

The linear range is generally a function of the number of satellites available, satellite geometry, and the signal-to-noise ratios associated with each signal. The linear range of the coarse time should be selected conservatively to prevent erroneous convergence of the navigation solution. Particularly, when coarse time error becomes large, the neglected terms in Eq. (1) produces an error that exceeds that of the expected pseudorange measurement error. When coarse time error is more than a few seconds the error can become significant. For example, a 10 second coarse time error will produce a range measurement error as large as 10 meters. In one application, the range of error of the coarse time is not more than approximately 3 to 4 seconds, although in some applications it may be as high as 10 seconds or more, depending upon the variables discussed above.

The range of convergence of a linear estimator can be extended by iteration. For the time solution discussed above, this implies that the linear solution is performed within a loop in which, following formation of each new linear estimate of the time error $\Delta t$, the solution is repeated with the pseudo range residual vector ($PR_{res}$ in Eq. 1) compensated for the nonlinear effect. This compensation is found using at least the next term in the series expansion for $PR_{res}$, i.e. $a_r \Delta t^2 / 2$, where the value of $\Delta t$ is found from the prior iteration of the linear estimator. The compensation which is performed in the $k^{th}$ iteration of the linear estimator is therefore of the form given by Eqn. 1.1 below:

$$PR_{res}{}^c{}_k = PR_{res} - a_r \Delta t_{k-1}^2 / 2$$  Eq. (1.1)

where the k and k-1 subscripts refer to iteration count.

Figure 2:
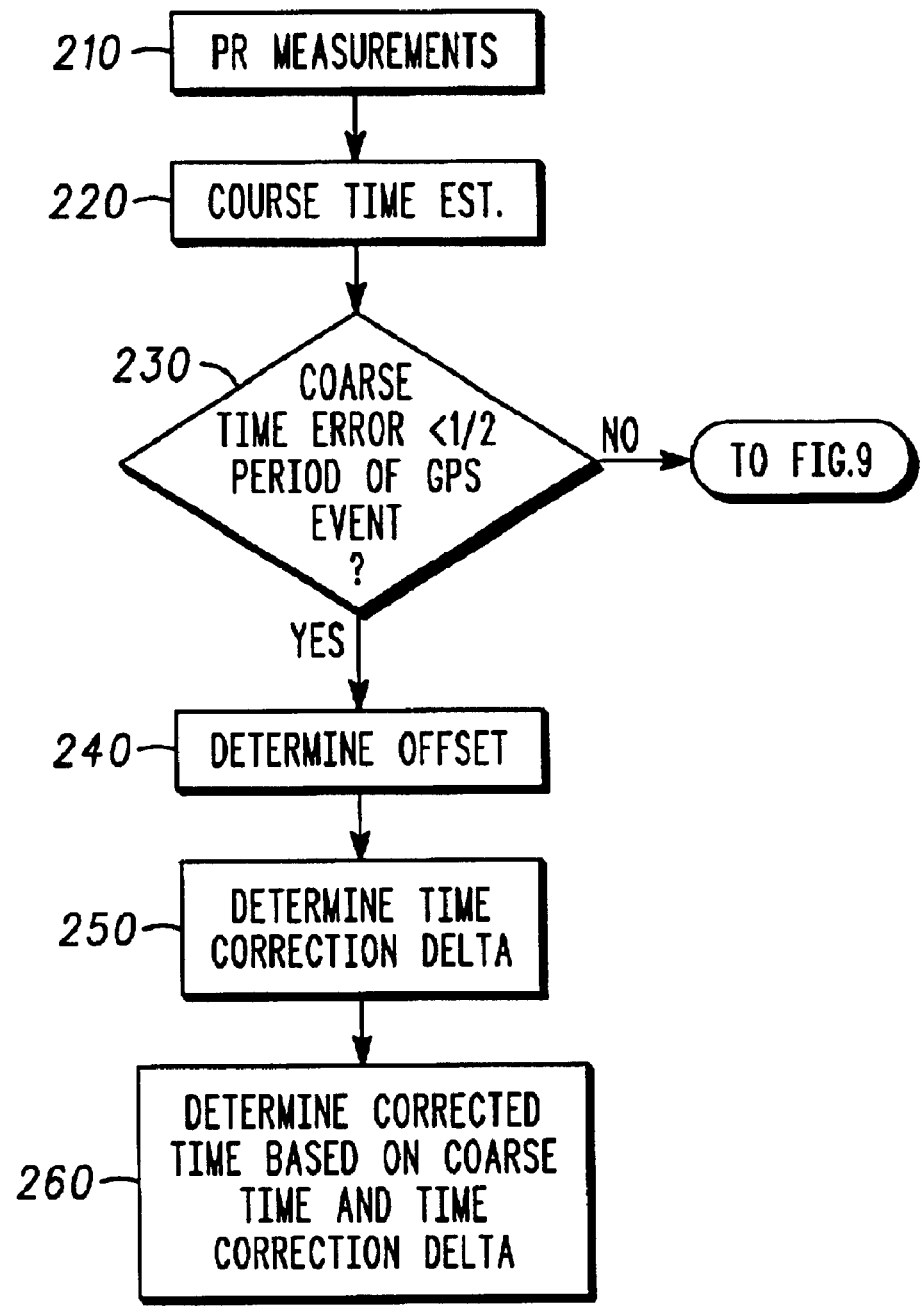
FIG. 2 is a process flow diagram for determining time according to an exemplary embodiment of the invention.

In FIG. 2, at block 210, pseudorange (PR) measurements for at least four satellites are made at the receiver, by means well known to those having ordinary skill it the art. In FIG. 2, the coarse time is assumed to be within the linear range of the navigation solution.

At block 220, in FIG. 2, a coarse time corresponding to the time of the PR measurements is determined. The coarse time may be estimated from one of several sources, for example, a local clock or from the wireless communications network in some wireless communication handset embodiments.

In FIG. 2, at block 230, a determination is made whether an error of the coarse time is less than ½ the period of the periodic GPS event. This determination may be made by estimating the uncertainty in the accuracy of the coarse time. For example, if the coarse time was generated by a local real-time clock (RTC) previously calibrated by the Time Of Week (TOW) data field included in the 50 BPS navigation data message, then the predicted stability of the real-time clock oscillator can be multiplied by the duration between present time and the time at which the TOW data field was used to calibrate the RTC. Alternately, if the coarse time is generated by sending a coarse time from a clock in the cellular network to the handset through an over-the-air protocol message, then the accuracy of the clock in the cellular network plus the estimated latency of the time to transmit the message through the network to the handset can be used to estimate the error in the coarse time.

Figure 3:
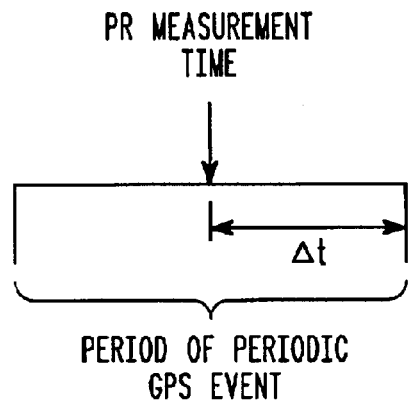
FIG. 3 illustrates an offset time of pseudorange measurements relative to a periodic GPS event.

At block 240, in FIG. 2, an offset time between a periodic GPS event of one of the at least four satellites and the coarse time is determined. FIG. 3 illustrates the relationship between the offset time (deltT), the periodic GPS event and the PR measurement.

There are many periodic GPS events that can be used to determine the offset time including, for example, the structure of the GPS navigation data message. Particularly, each satellite transmits a 50 bit per second (BPS) navigation data message synchronous with on-board atomic clocks, which are calibrated periodically. The navigation data message is a 1500 bit long frame comprising five 300-bit long subframes. It takes 30 seconds to transmit all 5 subframes, six seconds per each subframe.

Each subframe consists of ten 30-bit long words. The MSB of each word is transmitted first. Each subframe and/or page of a subframe contains a telemetry (TLM) word and a handover word (HOW), both generated by the SV, and start with the TLM/HOW pair. The TLM word is transmitted first, immediately followed by the HOW. The HOW is followed by eight data words. Each 30-bit word in each frame contains 6 parity bits and 24 information bits. One word is transmitted each 0.6 seconds. The grouping of 10 words is called a subframe. A subframe is transmitted every 6 seconds. A superframe consisting of subframes 1 through 5 is transmitted every 30 seconds.

Subframes 4 and 5 are subcommutated 25 times each, so that a complete data message requires the transmission of 25 full frames. The 25 versions of subframes 4 and 5 are referred to herein as pages 1 through 25 of each subframe. Further details of the data structure are contained in the GPS system specification document ICD-GPS-200 titled "Navstar GPS Space Segment/Navigation User Interfaces" by ARINC Research Corporation, 10 Oct. 1993.

Two parameters keep track of GPS system time, these parameters are called time-of-week (TOW) and week number (WN). The TOW parameter is based on the number of seconds from the start of the week, the TOW field ranging between zero and 604,800 seconds every week. At the end of the week, defined as midnight Saturday GMT, the TOW parameter is reset to zero and the week number is incremented by one. The GPS week number started at zero on Jan. 5, 1980. Thus, by interpreting the GPS week number and the TOW parameter, a GPS receiver can compute the local time and date.

For each satellite, the GPS navigation message sequence is synchronized at midnight Saturday GPS time to coincide with the $1^{st}$ bit of the $1^{st}$ word of the $1^{st}$ subframe, as well as the $1^{st}$ bit of the Gold spreading code. At precisely midnight Saturday GPS time, for each satellite, the $1^{st}$ bit of the $1^{st}$ word of the $1^{st}$ subframe and the $1^{st}$ bit of the Gold spreading code begins to leave the satellite for its short trip to the ground. The propagation delay from the satellite to the ground is typically about 60 to 100 milliseconds, depending on the location of the receiver. As a result, every proceeding bit that is transmitted from that time can be used as a time clock, where the "ticks" are in increments of 0.020 seconds, or one bit time. More precisely, if one can create a time tick synchronized to the time-of-arrival of a data bit edge in the receiver, and compensate for the satellite to receiver propagation delay and the satellite clock error, the absolute time of the event as measured at the receiver can be expressed as N*0.020 seconds, where N is the integer number of data bits since the start of the week.

The time of arrival of the data bit edge can be measured easily by a method such as a bit-sync detector as described in co-pending U.S. application Ser. No. 09/931120 entitled "Data Message Bit Sychronization And Local Time Correction Methods And Architectures", which is incorporated herein by reference, or by other synchronization methods such as the histogram bit synchronization method described by Parkinson in "Global Positioning System: Theory and Applications Volume 1" published by the American Institute of Aeronautics and Astronautics, 1996, page 395. Alternatively, several other methods are described by Spilker in "Digital Communications by Satellite" published by Prentice Hall, 1977, pages 431 through 449, including the popular early-late gate bit synchronizer.

Because of the periodic nature of the data bits, when the receiver obtains bit synchronization with a data bit edge, it can be said that the receiver "knows" precise time with an ambiguity of 0.020 seconds. The receiver however does not know the number of integer bits from the start of the week. A method of resolving the integer ambiguity N for the periodic GPS event is thus required to enable the receiver to determine time to an accuracy of tens of nanoseconds based on the measured time-of-arrival of the periodic event called bit-sync offset time.

The navigation data message structure has many other detectable periodic events associated that may also be used to determine time. For example, since the 50 BPS data message is collected into 30-bit words, each data word can be used as a time mark, for which the absolute time associated with the start of the 30-bit word is in increments of 0.6 seconds. Likewise, the start of each subframe (the $1^{st}$ bit of word 1 of each subframe, for example), can be used as a tick mark for which the absolute time associated with the bit is in units of 6 seconds. These, and others, can be used as a basis for detecting precise time in a GPS receiver.

Table 1 shows a summary of 7 of the events that could be used with the method of resolving the ambiguity. This is not an exhaustive list, since any sequence of "known bits" can be used to detect a time of arrival (TOA), which is known as some integer number N of the period of the GPS event increments with a repeat time.

TABLE 1

Seven Possible Periodic Events that can be used.

| EVENT | REPEAT TIME | EQUATION OF TIME |
|---|---|---|
| Preamble | 6.0 Seconds | N * 6.0 + 0.160 − Dtprop(sv) + Tcorr(sv) |
| Preamble + two Proceeding "00" bits | 6.0 Seconds | N * 6.0 − 0.160 − Dtprop(sv) + Tcorr(sv) |
| TLM Word Sync | 6.0 Seconds | N * 6.0 + 0.480 − Dtprop(sv) + Tcorr(sv) |
| TOW Word Sync | 6.0 Seconds | N * 6.0 + 0.940 − Dtprop(sv) + Tcorr(sv) |
| Word Parity Sync | 0.60 Seconds | N * 0.60 − Dtprop(sv) + Tcorr(sv) |
| Bit Sync | 0.020 Seconds | N * 0.020 − Dtprop(sv) + Tcorr(sv) |
| Code Sync | 0.001 Seconds | N * 0.001 − Dtprop(sv) + Tcorr(sv) |

Figure 4:
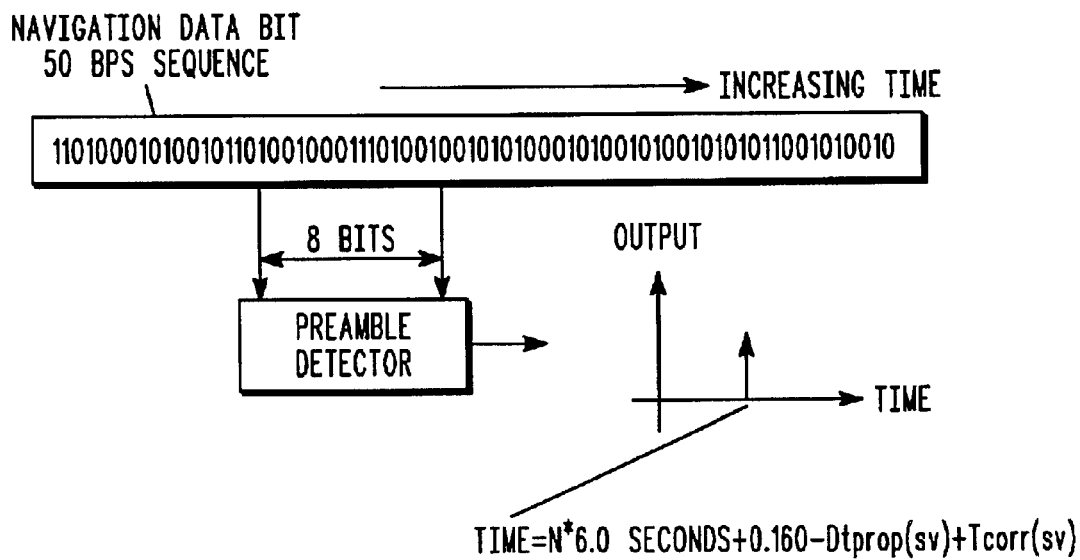
FIG. 4 illustrates detection of the arrival time of a message preamble and its relation to time.

FIG. 4 illustrates detection of the time of arrival of the message preamble by observation of the time of arrival of the 8 bit preamble "10001011". This sequence is transmitted by every satellite every 6.0 seconds to note the beginning of the subframe boundary. The detector is simply a bit-by-bit comparison of an 8-bit long sequence of the received data message, when every bit agrees with the pattern "10001011", then the output pulse notes time with 6 second ambiguity, the time of the pulse being N*6 seconds since the start of the week. Alternatively, the sequence can be detected with a data correlation method as described in U.S. Pat. No. 6,346,911 entitled "Method And Apparatus For Determining Time In A GPS Receiver", where the signal might be too weak to detect each individual data bit reliably. Because any 8-bit sequence of bits can randomly match the "10001011" preamble data pattern, some form of confirmation is necessary to ensure that the preamble was received. One form of confirmation might be that the two consecutive preamble patterns are observed precisely 6 seconds apart. Alternatively, confirmation of the pattern can also be obtained by observation of simultaneous preamble arrival times from two or more satellites, after of course, compensating for the propagation time and satellite clock error differences represented by the terms Dtprop(sv) and Tcorr(sv).

In FIG. 4, the quantitative expression for time based upon preamble detection is given by $$\text{Time} = N*6.0 + 0.160 - D t \text{prop}(sv) + T \text{corr}(sv),\qquad\text{Eq. (2)}$$

where N is the unknown number of integer subframes transmitted since the beginning of the week. The constant 0.160 seconds represents the time associated with transmitting 8 bits of the preamble, detecting the 8 bits cannot occur until all 8 bits are received. Since the preamble is transmitted in bit locations 1–8 of word 1 of the subframe, and the start of the subframe represents time to a multiple of an integer 6.0 seconds, detection of the full preamble cannot occur until 8*0.020=0.160 seconds after the start of the subframe. The parameter Dtprop(sv) represents the signal propagation time (satellite to user) of the detected satellite signal, which is computable via the ephemeris data, the coarse time estimate, and the approximate location of the user terminal. The parameter Tcorr(sv) is the satellite clock error, computable from transmitted parameters that are provided in the navigation data message and the coarse time estimate. The clock correction parameters are measured by the GPS ground station for each satellite and uploaded to the satellite for distribution to the user community for the purpose of modeling the clock error.

Figure 5:
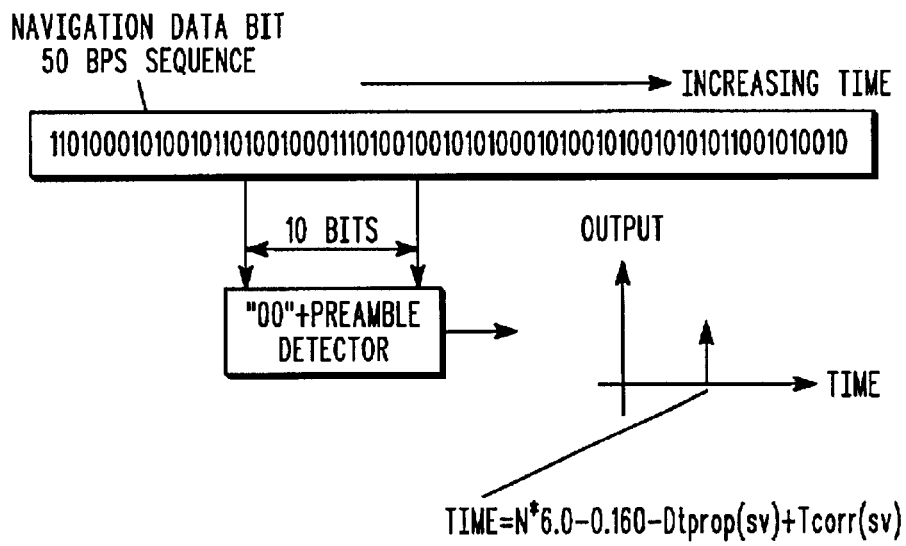
FIG. 5 illustrates detection of the arrival time of a message preamble plus two additional bits and its relation to time.

FIG. 5 illustrates detection of the time of arrival of the preamble plus the two preceding bits (00) by observation of the time of arrival of the 10-bit long sequence consisting of the last two bits of subframe 1 (always "00") and the $1^{st}$ 8 bits of subframe 1, the combination of which form a known 10 bit sequence that may be detected as discussed above. In FIG. 5, the quantitative expression for time based upon the 10-bit preamble detection is given by $$\text{Time}=N*6.0-0.160-D t\text{prop}(sv)+T\text{corr}(sv), \quad \text{Eq. (3)}$$

The two extra bits are at the front-end of the sequence, and are actually the last two bits of the proceeding subframe. Consequently, the time associated with the start of the $1^{st}$ bit of the 10 bit sequence is 0.040 seconds earlier, thus the offset time from the start of the subframe to detect the full 10 bit sequence is still 0.160 seconds.

Figure 6:
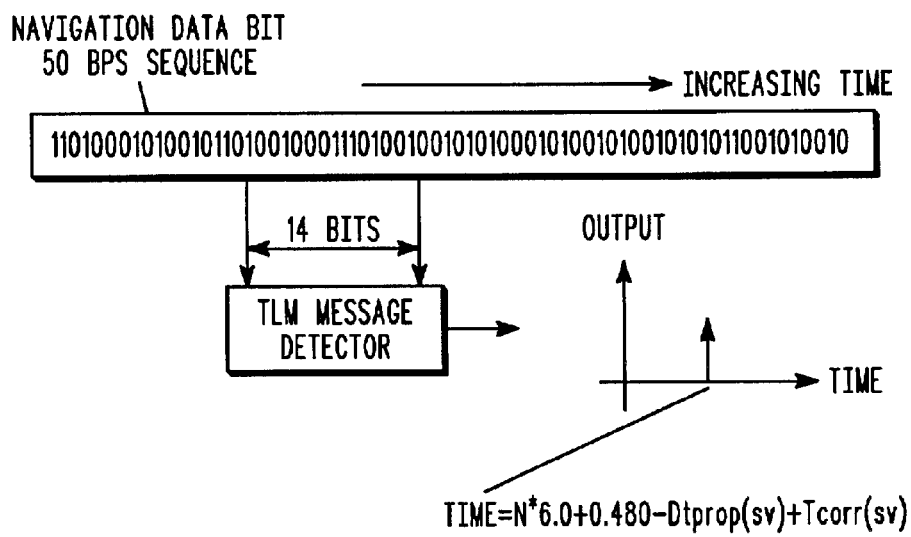
FIG. 6 illustrates detection of the arrival time of a TLM message and its relation to time.

In FIG. 6, detection of the TLM message, which has a 14-bit long sequence of bits located in bits 9–22 of word 1 of each subframe, forms the basis for the time determination. The TLM word can be known by the receiver (for example, transmitted to the receiver from another source, or observed from the previous subframe). Thus, the TOA of the TLM word can be used as a source of periodic events. In FIG. 5, the quantitative expression for time based upon 14-bit TLM message is given by $$\text{Time}=N*6.0+0.480-D t\text{prop}(sv)+T\text{corr}(sv), \quad \text{Eq. (4)}$$

Figure 7:
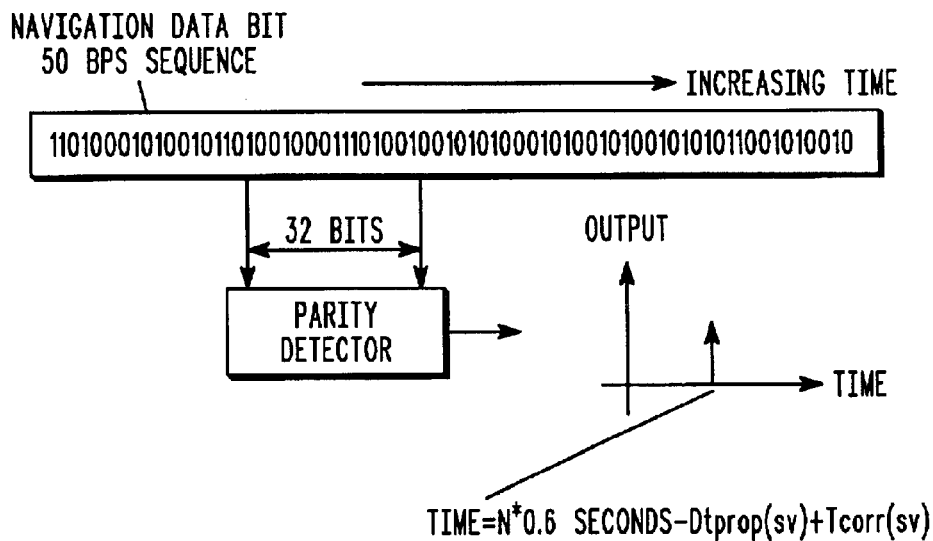
FIG. 7 illustrates detection of the arrival time of parity synchronization bits and its relation to time.

In FIG. 7, detection of a 32-bit word parity is the periodic GPS event from which time is determined. When the parity detector indicates positive parity, the TOA of one of the 10 word boundaries has been detected and the time is known to 0.6 second ambiguity. For this case, the equation of time is given by $$\text{Time}=N*0.60-D t\text{prop}(sv)+T\text{corr}(sv). \quad \text{Eq. (5)}$$

where N in this case is the number of words transmitted by the satellite since the start of the week, i.e., the repeat interval.

In FIG. 7, every time a new bit is received (every 0.020 seconds), the process repeats by testing the 32 bits consisting of the newest bit received and the previous 31 bits until parity sync is observed. The parity algorithm operates on the 30 bit words but also includes the last two bits from the previous word, thus the algorithm needs to observe the previous 32 bits received to provide an indication of parity pass or failure.

Figure 8:
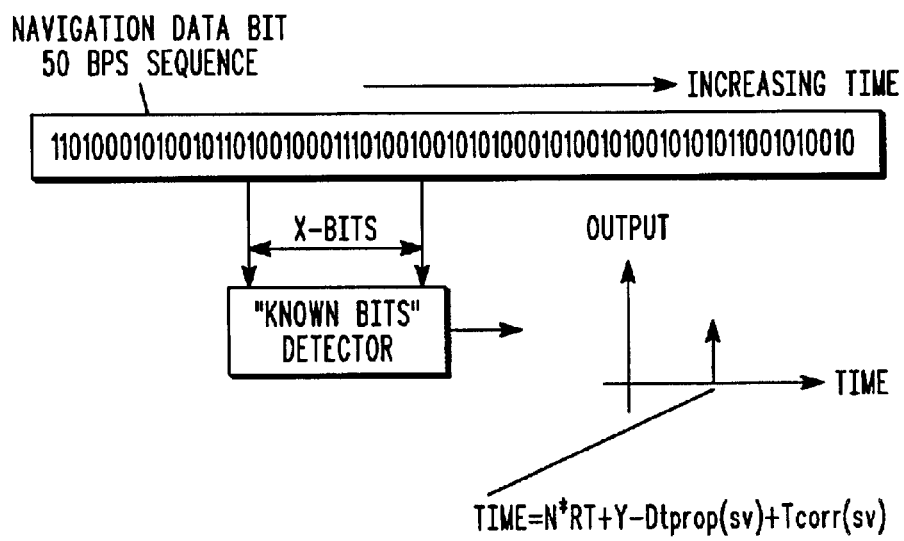
FIG. 8 illustrates detection of the arrival time of any known sequence of bits and its relation to time.

FIG. 8 illustrates, generally, that any sequence of "known bits" can be used to determine time, wherein the time is known as some integer number N times the repeat time (RT) of the known bits plus some offset time Y, where Y is the offset time of the known bits detection event relative to the start of the repeat time of the GPS periodic event. For the example in FIGS. 4 & 5, RT is 6.0 seconds, and Y is 0.160 seconds.

In FIG. 2, at block 250, a time correction delta is determined based upon the period of the periodic GPS event, the offset time and the coarse time value by computing a modulus of first and second quantities. The first quantity is a summation of the time value, offset time, satellite clock error and propagation time of the satellite having the periodic event used to determine the offset time, and the second quantity is the period of the periodic GPS event. The quantitative expression is:

$$F\bmod(a,b)=[(a/b)-\text{int}(a/b)]*b \quad \text{Eq. (6)}$$

where "a" is the summation of the time value, offset time, satellite clock error and propagation time, "b" is the period of the periodic GPS event, and "int(a/b)" is the integer portion of the ratio "a/b".

In FIG. 2, at block 260, the corrected time is determined based upon the coarse time and the time correction delta, provided that the error of the coarse time is less than ½ the period of the periodic GPS event. In some embodiments, the integrity of the corrected time may be assessed by determining additional corrected times based upon an offset time between the periodic GPS event of a corresponding number of additional satellites and the coarse time, and then comparing the first corrected time with the other corrected times. In still other embodiments, the integrity of the corrected time may be assessed by repeating the time determination process with additional sets of pseudorange measurements, and then observing the stability of the corrected time solution.

Figure 9:
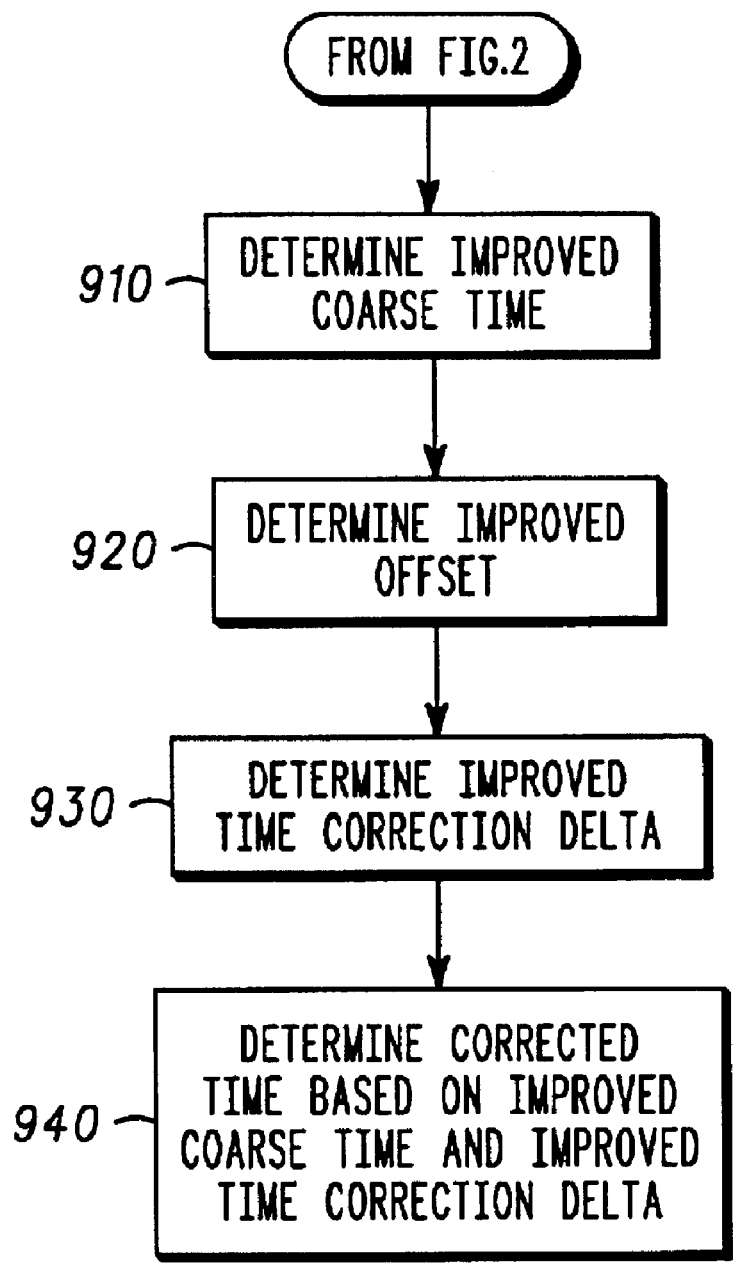
FIG. 9 is process flow diagram for determining time according to another exemplary embodiment of the invention.

In FIG. 2, at block 230, if the error of the coarse time is not less than ½ the period of the periodic GPS event, processing proceeds in FIG. 9. Particularly, in FIG. 9, at block 910, an improved coarse time is determined if the coarse time is within the linear range but not less than ½ the period of the periodic GPS event. The improved coarse time may be determined, for example, by computing an overdetermined navigation time solution, which is based upon the at least four pseudorange measurements and the coarse time.

In FIG. 9, at block 920, an improved offset time between a periodic GPS event of one of the four satellites and the improved coarse time is determined, as discussed generally above with reference to FIG. 3. Thereafter, at block 930, an improved time correction delta is determined based upon the period of the periodic GPS event, the improved offset time and the improved coarse time according to Eq. (6). Thereafter, at block 940, the corrected time is determined based upon the improved coarse time and the improved time correction delta.

Figure 10:
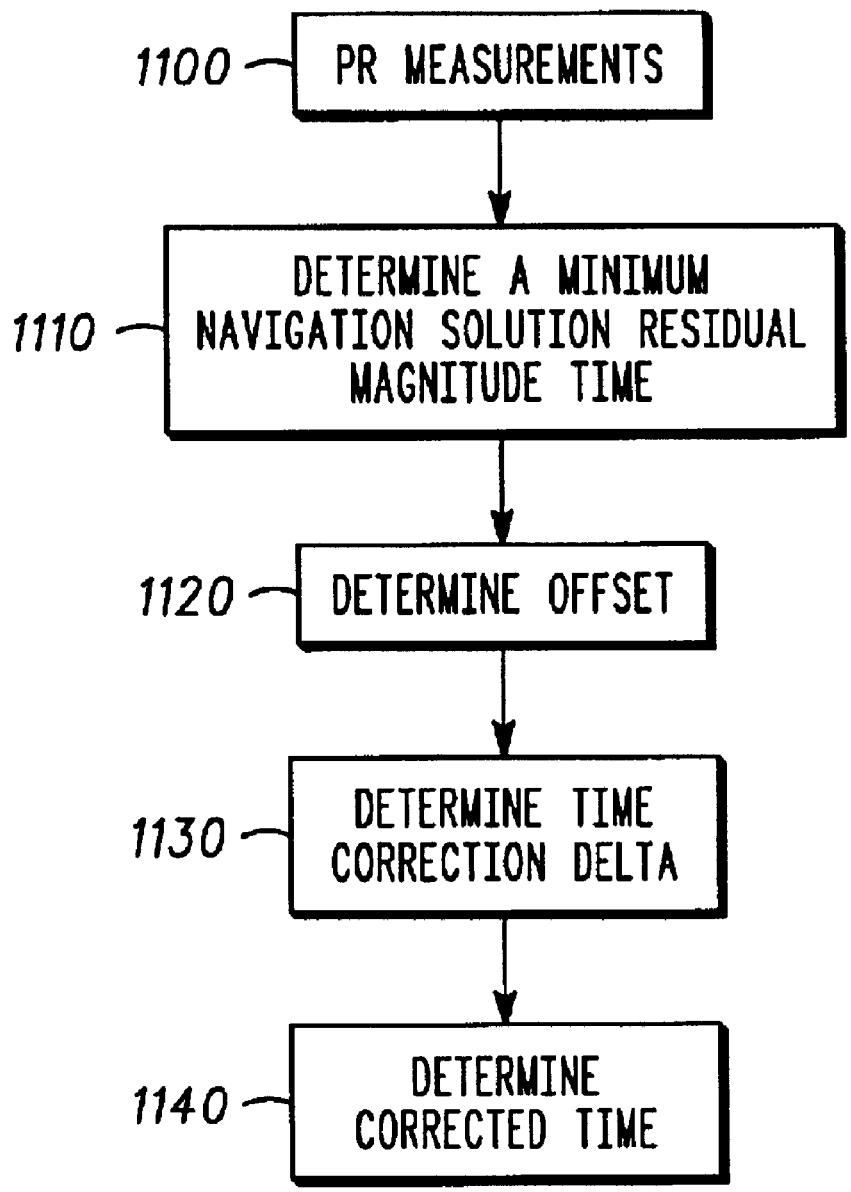
FIG. 10 is process flow diagram for determining time according to yet another exemplary embodiment of the invention.

If the coarse time is not within the linear range, the corrected time is determined according to the process of FIG. 10. At block 1100, pseudorange (PR) measurements for at least four satellites are made at the receiver as discussed above. At block 1110, a minimum navigation solution residual magnitude time is determined. At block 1120, an offset time between a periodic GPS event of one of the four satellites and the minimum navigation solution residual magnitude time is determined. At block 1130, a time correction delta based upon the period of the periodic GPS event, the offset time, and the minimum navigation solution residual magnitude time is determined, and at block 1140, the corrected time is determined based upon the time correction delta and the minimum navigation solution residual magnitude time.

Figure 11:
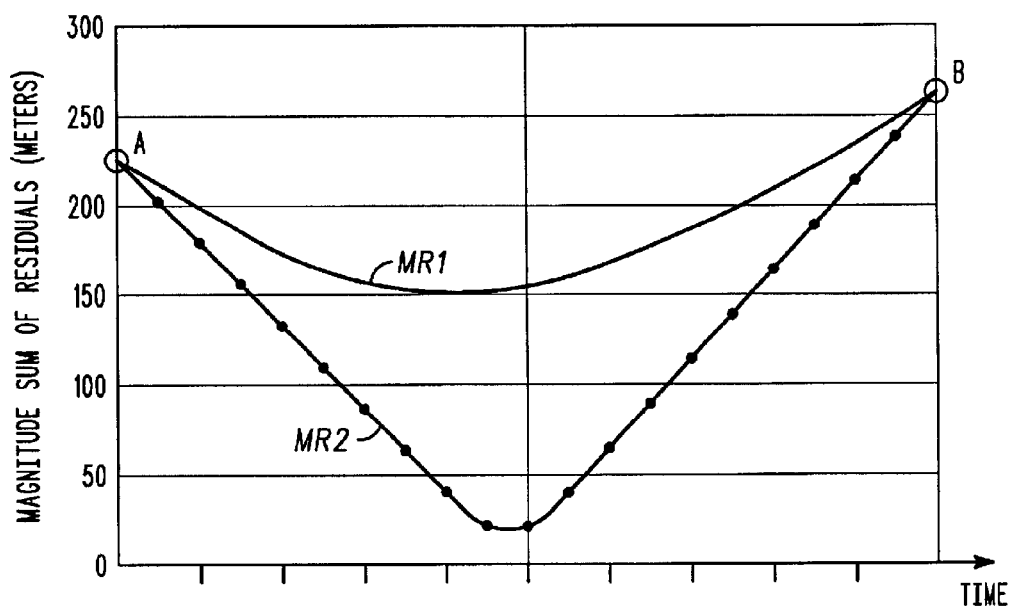
FIG. 11 illustrates plots of navigation solution residual magnitude versus time.

The minimum navigation solution residual magnitude time is determined by iteratively computing a navigation solution residual magnitude based on the at least four pseudorange measurements and a coarse time incremented by an incremental time value over a predetermined range, for example the estimated range of error of the coarse time. FIG. 11 illustrates the magnitude of the residuals versus time.

In one embodiment, the range over which time is incremented is reduced until the range is less than ½ the period of the periodic event, at which time the minimum navigation solution residual magnitude time will be less than ½ the period of the periodic event. In FIG. 11, for example, the data points A and B represent a relatively large time increment, between which the minimum navigation solution residual magnitude is known to be located based on the estimated plot $MR_1$. Thereafter, the time increment is reduced to more accurately determine where between data points A and B the minimum navigation solution residual magnitude and corresponding time are located, as indicated by the plot $MR_2$.

In one embodiment, the navigation solution residual magnitude is computed until an error of the navigation solution residual magnitude time is within a linear range of the navigation time solution, for example when the range over which the time value is incremented is approximately 3 or 4 seconds as discussed above. At that point, the minimum navigation solution residual magnitude time value may be used in the process of FIG. 9 to directly compute the corrected time. If iteration continues until the error of the minimum navigation solution residual magnitude time is less than ½ the period of the periodic GPS event, then the corrected time may be computed according to the process of FIG. 2.

As discussed above, the integrity of the corrected time computed according to the process of FIG. 10 and/or FIGS. 2 & 9 may be assessed by re-computing corrected time based on the offset for one or more additional satellites, or repeating the time determination steps with alternate sets of pseudorange measurements, and then comparing the results.

The following discussion represents a level of detail of one time solution approach. The time determination approach proceeds as follows: a "coarse" GPS time is associated with the set of code phases (or pseudo ranges) derived by the GPS receiver for all acquired satellites. Although time is not yet accurately known, a bit sync process has identified the location of the navigation data bit edges for an acquired satellite. Alternatively, the time of one of the other periodic events shown in Table 1 may be detected as described above in this specification. The discussion that follows is relative to a bit-sync event. Alternatively, however, the same method discussed for bit-sync can be applied to any periodic GPS event described in Table 1 by replacing the repeat interval of the bit sync event (i.e., 20 milliseconds) with the repeat interval of the particular periodic event. For example, if a preamble event was used for the periodic event, then the repeat time is 6.0 seconds and so forth.

As shown in FIG. 3, the bit sync process has identified the interval Δt in the figure, indicating the time interval between the pseudo range measurements and the next navigation data bit edge. This coarse GPS time (denoted PR Measurement Time in FIG. 3) may be in error by a few seconds, or even a few minutes. The selection of an optimum time determination approach will depend upon the expected accuracy of this coarse, initial time estimate. Should the coarse time be in error of several minutes, an iterative solution is required, perhaps followed by a direct linear solution for the time offset. Alternatively, if the coarse time is in error by only a few seconds, the iteration can be replaced by a simpler, direct linear solution, which avoids the time consuming iteration.

For the iterative approach, the navigation solution residual can then be used as a measure of closeness of the time assumption in order to resolve the ambiguity.

FIG. 11 shows the sum of the residuals of a 6 satellite solution by varying the assumed time of the fix in integer steps of 20 milliseconds, from −200 milliseconds to +200 milliseconds. This is the duration of +/−10 bit sync times or +/−one 10-bit preamble period. As you can see, the sum of residuals is a valid statistic for measuring the time error of the assumed solution, and only "trials" needing to be tested are in steps of N*20 milliseconds from some assumed time, the time modulo 20 milliseconds is known by the bit sync method.

If the initial time error is believed to be in error by a few seconds, or the iteration from a larger initial time error has converged to within a few seconds, a direct solution approach can be used. Such an approach works because the nonlinear effects, caused by satellite range accelerations and higher order derivatives, as illustrated in Eq. (1), are insignificant relative to nominal pseudo range errors. The linearity enables direct modeling of the time offset as an additional unknown in the Least Squares (LS) or Weighted Least Squares (WLS) solution for position and clock offset from the set of pseudo range measurements. The additional unknown, which represents the error in knowledge of the GPS measurement time (i.e., the pseudo range measurement time), is observable through the estimated range rate to each satellite. The range rate can be estimated using the satellite ephemeris data to compute each satellite's velocity, and then projecting each velocity vector along the line of sight to each satellite. The revised measurement gradient vector thus becomes:

$$h_i^T = [u_i^T 1 R^{dot}_i] \qquad \text{Eq. (7)}$$

Note that Eq. 7 represents the measurement observability for the four estimated states, including the GPS time offset in addition to the three position error components (observable through $u_i^T$), and the user clock error.

Once the "coarse" GPS time has been corrected using either method, or perhaps the methods in combination, the desired 1-millisecond accuracy is achieved by integrating the time solution with knowledge of bit sync. Refer back to FIG. 3 for clarification. As long as the residual error in the initial determination of time is within 10 milliseconds (i.e., one-half the time period of the periodic event), the correct navigation data bit edge time can be determined to sub-millisecond accuracy. The details of the integration of bit sync information with time determination are illustrated in the equation set below:

$$t_{GPS}^{c1} = t_{GPS}^{i} - \Delta t_{corr} \qquad \text{Eq. (8)}$$

where: $t_{GPS}^{c1}$ is the GPS time of the pseudo range measurements after the first step of time determination, i.e., the corrected coarse time ($t_{GPS}^{i}$ is the coarse time), $\Delta t_{corr}$ is the correction to the initial, assumed GPS time $t_{GPS}^{i}$ generated by the first step of time determination.

$$t_{GPS}^{b} = t_{GPS}^{c1} + \Delta t_{bs} \qquad \text{Eq. (9)}$$

where $t_{GPS}^{b}$ represents the corrected GPS time of the nearest bit edge (periodic event) following the pseudo range measurement time.

$$t_{GPS}{}^{r1}=t_{GPS}{}^{b}-(R/c)+\Delta t_{sv} \qquad \text{Eq. (10)}$$

where $t_{GPS}{}^{r1}$ represents an estimate of the time of transmission (from the satellite used to determine bit sync) of the navigation data bit edge; R is the estimated range to the satellite; c is the speed of light; and $\Delta t_{sv}$ is the computed correction to the satellite's clock.

$$t_{GPS}{}^{t20}=(\text{int})((t_{GPS}{}^{r1}+0.01)/0.02) \qquad \text{Eq. (11)}$$

The time computed in Eq. 11 represents the corrected GPS time of transmission of the navigation data bit edge at the satellite, so should be an integer multiple of 20 msecs (0.02 seconds in Eq. 11). The residual error in can thus be found from Eq. 5 below:

$$\Delta t_{corr2}=t_{GPS}{}^{r1}-0.02t_{GPS}{}^{t20} \qquad \text{Eq. (12)}$$

The final, corrected GPS time, accurate to sub-millisecond, is found as:

$$t_{GPS}{}^{c2}=t_{GPS}{}^{c1}-\Delta t_{corr2} \qquad \text{Eq. (13)}$$

Although the method described above is relative to a bit-sync event, the process can be modified slightly to work relative to any periodic event listed in Table 1. In fact, the process works better if the periodic event time is larger (i.e., a preamble sync, TOW sync, TLM word sync, or parity sync instead of a bit-sync event or a code correlation event).

The method described to this point discusses a method of setting time in an MS-based GPS-enabled handset or an autonomous GPS receiver, in which the final position solution is computed internally to the receiver. In an MS-based handset equipped with a GPS receiver, the approximate position, ephemeris data, and satellite clock correction data necessary to compute position in the handset are already known either by previous GPS satellite demodulation or by delivery to the handset via an over-the-air protocol message. In this case, the GPS receiver makes one or a number of pseudorange measurements and then measures the time between the measurement time and the time of arrival from at least one satellite of one of the periodic events shown in Table 1. The time of arrival is noted as being ambiguous with the repeat interval, and a direct or iterative overdetermined navigation solution is used to resolve the ambiguity of time. After the ambiguity in time is solved for, the correct navigation solution can be computed with no error associated with a time error.

The same method can be used in an MS-Assisted handset, in which the position solution is computed outside of the GPS equipped handset in remote position computation equipment (PDE). The remote position computation equipment obtains near real-time ephemeris and satellite clock correction data for all visible satellites from a local GPS receiver or from a web-based server. The MS-Assisted handset simply measures pseudoranges to a series of visible satellites, applies a time-tag to the measurements based on at least one satellite, and then sends the pseudoranges and time tag observed to the PDE for final position computation. The invention can be used to time-tag the pseudorange measurements from the MS-Assisted handset so that the remote PDE can compute the time of the pseudorange measurements and ultimately compute position based on those measurements and other data including satellite ephemeris, clock correction data, and perhaps an approximate position of the mobile.

In order to accomplish this, the handset must, in the formatted message to the PDE, identify which satellite was used to measure the time difference between the periodic event and the time of the pseudorange measurements. This can be accomplished by sending the satellite ID for the satellite used to make the periodic event measurement. In addition, the formatted message includes the time difference between the selected satellite's periodic event time and the time of the pseudorange measurements. Finally, the handset identifies which type of periodic event was used to make the observation so that the PDE can factor in the periodic event time interval into the process of resolving the time ambiguity.

An alternative to sending a time difference between the periodic event observed on one satellite and the pseudorange measurements, it is possible to send a time tag of the pseudorange measurements in GPS time units that is modulo the time period of the periodic event. If the handset has satellite ephemeris and clock correction and an approximate position data internally stored (as is required for MS-based handsets), the propagation time between the satellite and the GPS receiver and the satellite clock correction data can be factored into generation of the time tag without having to compute position in the handset. This eliminates needing to identify and transmit to the PDE which satellite was used to make the periodic event observation time. This is accomplished in the handset by applying the equation:

$$\text{Tgps\_local\_ambiguous}=f\text{mod}(T\text{periodic}+dt1, T\text{repeat}); \qquad \text{Eq. (14)}$$

where Tperiodic is obtained using the equations shown in Table 1 based on the type of periodic event, the ephemeris, approximate position, and approximate time (to compute dTprop), and the clock correction data to compute Tcorr. Trepeat is the repeat time of the periodic event. Dt1 is the time difference between the observation of the periodic event and the time of the pseudorange measurements. Note dT1 can be positive (that is, the periodic event was observed before the pseudorange measurements were made), or negative (the periodic event was observed after the pseudorange measurements were made).

For example, if the periodic event observed is the preamble arrival, Tgps_local_ambiguous will be a local time measure (in GPS time coordinates) of the time of the pseudorange measurement. The value of Tgps_local_ambiguous will range between 0 and 6 seconds. If the periodic event observed was a parity sync event, then Tgps_local_ambiguous will range between 0 and 0.6 seconds. The handset makes this computation of Tgps_local_ambiguous and sends it as a time-tag of the pseudorange measurements to the PDE along with some type of indicator describing the periodic event period that was used to make the observation. The PDE notes the time tag (Tgps_local_ambiguous) and the periodic event period (example, 6 seconds, or 0.6 seconds), and uses the method described earlier to find the ambiguity in the time tag Tgps_local_ambiguous. That is, since $\text{Tgps}_{local}$_ambiguous is modulo the repeat time, the actual time of the pseudorange observations is given by $$\text{Tgps\_local\_unambiguous}=N*T\text{repeat}+\text{Tgps\_local\_ambiguous} \qquad \text{Eq. (15)}$$

where the ambiguity N is solved for in the PDE by using a direct or iterative overdetermined navigation solution as described earlier.

For the case where position is determined in the network, once the PDE has determined position of the mobile and the precise local time associated with the measurement, the network can send back to the mobile its computed position for use in the mobile. This new position estimate can be used as a basis for an approximate position the next time a position request is needed. In addition, the network can send to the mobile the resolved absolute time of the pseudorange measurements that were used to compute position in the PDE. Once the precise unambiguous time of the pseudorange measurements are delivered to the handset, the handset can use this precise time as a basis for calibrating a local real-time clock in the handset. In order to perform the post-fix time calibration, the handset would, at the time of the pseudorange measurement, simultaneously read a local real-time clock and store the time in memory, $T_{rtc\_meas}$. The pseudorange measurements would be sent to the network PDE equipment along with either one of the following:

1) A time difference that is the difference in time between the time of the pseudorange measurements and the time of observation of a periodic event and a satellite ID or other identifier so that the network can determine which satellite was used to observe the periodic event.

2) An ambiguous local time tag that is based on the measured time difference in (1) and also based on the estimated satellite to user propagation time and the satellite clock correction.

Then, the network PDE equipment would resolve the mobile's position and time of the pseudorange measurement as described earlier. The network would then send the position of the mobile and the resolved time of the measurements back to the mobile, call this $T_{resolved}$. The mobile can then compute a time error of the local RTC by differencing $T_{resolved}$ and $T_{rtc\_meas}$, and use this difference to adjust or calibrate the time currently stored in the RTC. For example, the local RTC time could be adjusted as shown in Eq. (16).

$$\text{Local\_RTC\_Time} = \text{Local\_RTC\_Time} + (T_{resolved} - T_{rtc\_meas}); \quad \text{Eq. (16)}$$

The difference between $T_{resolved}$ and $T_{rtc\_meas}$ may be used to calibrate or improve the time stored in the local RTC for use as a precise time source such as is required for computing position locally or for time tagging future pseudorange measurements with a precise unambiguous local time tag. The precision of the local real time clock time may also be improved based upon the pseudorange measurement time corrected on the handset, rather than at the network.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a Global Positioning System (GPS) receiver, comprising:
    determining pseudorange measurements for at least four satellites at a coarse time corresponding to the pseudorange measurement;
    determining an offset time between a periodic GPS event of one of the four satellites and the coarse time;
    determining a time correction delta based upon the period of the Periodic GPS event, the offset time and the coarse time if an error of the coarse time is less than ½ the period of the periodic GPS event;
    determining corrected time based upon the coarse time and the time correction delta if the error of the coarse time is less than ½ the period of the Periodic GPS event.

2. The method of claim 1, determining a second corrected time based upon an offset time between the periodic GPS event of a second one of the four satellites and the coarse time, evaluating corrected time integrity by comparing the corrected time with the second corrected time.

3. The method of claim 1, determining a subsequent corrected time based upon determining subsequent pseudorange measurements for at least four satellites, evaluating corrected time integrity by comparing the first corrected time with the subsequent corrected time.

4. The method of claim 1,
    determining an unproved time correction delta based upon the period of the periodic GPS event, the offset time and an improved coarse time if the error of the coarse time is not less than ½ the period of the periodic GPS event;
    determining the corrected time based upon the improved coarse time and the improved time correction delta if the error of the coarse time is not less than ½ the period of the periodic GPS event.

5. The method of claim 4, determining the improved coarse time from a navigation time solution based upon the at least four pseudorange measurements and the coarse time.

6. The method of claim 4, determining the corrected time based upon the improved coarse time and the improved time correction delta if the improved coarse time is within a linear range of the navigation time solution.

7. The method of claim 4, determining a second corrected time based upon an offset time between the periodic GPS event of a second one of the four satellites and the coarse time, evaluating corrected time integrity by comparing the corrected time with the second corrected time.

8. The method of claim 4, followed by at least one repetition of its time determination steps with subsequent sets of pseudorange measurements, evaluating corrected time integrity by comparing the first corrected time with subsequent corrected times.

9. The method of claim 4, determining the improved time correction delta by computing a modulus of first and second quantities, the first quantity is a summation of the improved coarse time, offset time, satellite clock error and propagation time of the satellite having the periodic event used to determine the offset time, the second quantity is the period of the periodic GPS event.

10. The method of claim 1, determining the time correction delta by computing a modulus of first and second quantities, the first quantity is a summation of the coarse time, offset time, satellite, clock error and propagation time of the satellite having the periodic event used to determine the offset time, the second quantity is the period of the periodic GPS event.

11. The method of claim 1, determining the corrected time based upon an improved coarse time and an improved time correction delta if the error in the coarse time is not less than ½ the period of the periodic GPS event and if the coarse time is within a linear range of the navigation time solution.

12. The method of claim 1, the periodic GPS event is a periodic aspect of a GPS navigation data message of one of the four satellites, determining the offset time between the periodic aspect of the GPS navigation data message and the coarse time.

13. The method of claim 1, the periodic GPS event is based upon a GPS navigation data message preamble of one of the four satellites, determining the offset time between the periodic GPS event based upon the GPS navigation data message preamble and the coarse time.

14. The method of claim 1, the periodic GPS event is based upon a repeating sequence of known GPS navigation data message bits of one of the four satellites and the coarse time, determining the offset time between the repeating sequence of known GPS navigation data message bits and the coarse time.

15. The method of claim 1, the periodic GPS event is based upon a parity sync detection event of one of the four satellites and the coarse time, determining the offset time between the parity sync detection event and the coarse time.

16. The method of claim 1, the periodic GPS event is based upon a bit-sync event of one of the four satellites and the coarse lime, determining the offset time between the bit-sync event and the coarse time.

17. The method of claim 1, the periodic GPS event is based upon a code-phase synchronization event of one of the four satellites and the coarse time, determining the offset time between the code-phase synchronization event and the coarse time.

18. The method of claim 1, the periodic GPS event is based upon a time of week synchronization event of one of the four satellites and the coarse time, determining the offset time between the time of week synchronization event and the coarse time.

19. A method in a Global Positioning System (GPS) receiver, comprising:

determining pseudorange measurements for at least four satellites;

determining a minimum navigation solution residual magnitude time;

determining an offset time between a periodic GPS event of one of the four satellites and the minimum navigation solution residual magnitude time;

determining a time correction delta based upon the period of the Periodic GPS event, the offset time, and the minimum navigation solution residual magnitude time;

determining corrected time based upon the time correction delta and the minimum navigation solution residual magnitude time.

20. The method of claim 19, the periodic GPS event is based upon a parity sync detection event of one of the four satellites and the coarse time, determining the offset time between the parity sync detection event and the coarse time.

21. The method of claim 20, incrementing the coarse time over a range corresponding to an estimated error of the coarse time, reducing the range over which time is incremented until the range is less than ½ the period of the periodic event.

22. The method of claim 19, the periodic GPS event is based upon a bit-sync event of one of the four satellites and the coarse time, determining the offset time between the bit-sync event and the coarse time.

23. The method of claim 19, the periodic GPS event is based upon a code-phase synchronization event of one of the four satellites and the coarse time, determining the offset time between the code-phase synchronization event and the coarse time.

24. The method of claim 19, the periodic GPS event is based upon a time of week synchronization event of one of the four satellites and the coarse time, determining the offset time between the time of week synchronization event and the coarse time.

25. The method of claim 19, determining the minimum navigation solution residual magnitude time by iteratively computing a navigation solution residual magnitude based on the at least four pseudorange measurements and a coarse time incremented by a first time increment over a first predetermined range.

26. The method of claim 19, determining a second minimum navigation solution residual magnitude time by iteratively computing the navigation solution residual magnitude based on the at least four pseudorange measurements and the minimum navigation solution residual magnitude time incremented by a second time increment over a second predetermined range, the second time increment less than the first time increment and the second predetermined range less than the first predetermined range.

27. The method of claim 19, determining the time correction delta by computing a modulus of first arid second quantities, the first quantity is a summation of the minimum navigation solution residual magnitude time, offset time, satellite clock error, and propagation time of the satellite having the periodic event used to determine the offset time, the second quantity is the period of the periodic GPS event.

28. The method of claim 19, the periodic GPS event is a periodic aspect of a GPS navigation data message of one of the four satellites, determining the offset time between the periodic aspect of the GPS navigation data message and the coarse time.

29. The method of claim 19, the periodic GPS event is based upon a GPS navigation data message preamble of one of the four satellites, determining the offset time between the periodic GPS event based upon the GPS navigation data message preamble and the coarse time.

30. The method of claim 19, the periodic GPS event is based upon a repeating sequence of known GPS navigation data message bits of one of the four satellites and the coarse time, determining the offset time between the repeating sequence of known GPS navigation data message bits and the coarse time.

31. The method of claim 19, determining a second corrected time based upon an offset time between the periodic GPS event of a second one of the four satellites and the coarse time, evaluating corrected time integrity by comparing the corrected time with the second corrected time.

32. The method of claim 19, followed by at least one repetition of its time determination steps with subsequent sets of pseudorange measurements, evaluating corrected time integrity by comparing the first corrected time with subsequent corrected times.

33. The method of claim 19, iteratively computing the navigation solution residual magnitude until an error of the navigation solution residual magnitude time is within a linear range of the navigation time solution.

34. The method of claim 19, determining the time correction delta based upon the period of the periodic (GPS event, the offset time and the navigation solution residual magnitude time if an error of the navigation solution residual magnitude time is within the linear range of the navigation time solution and is less than ½ the period of the periodic GPS event;

determining corrected time based upon the navigation solution residual magnitude time and the time correction delta if the error of the navigation solution residual magnitude time is within the linear range of the navigation time solution and is less than ½ the period of the periodic GPS event.

35. The method, of claim 34,
determining the time correction delta based upon the period of the periodic GPS event, the offset time and an improved navigation solution residual magnitude time if an error of the navigation solution residual magnitude time is within the linear range of the navigation time solution but not less than ½ the period of the periodic GPS event;

determining the corrected time based upon the improved navigation solution residual magnitude time within the linear range of the navigation time solution and the time correction delta if the error of the navigation solution residual magnitude time within the linear range of the navigation time solution is not less than. ½ the period of the periodic GPS event.

36. The method of claim 35, determining an improved navigation solution residual magnitude time from a navigation time solution based upon the at least four pseudorange measurements and the navigation solution residual magnitude time within the linear range of the navigation time solution.

37. The method of claim 19, determining a second corrected time based upon an offset time between the periodic GPS event of a second one of the four satellites and the coarse time, evaluating corrected time integrity by comparing the corrected time with the second corrected time.

38. The method of claim 19, followed by at least one repetition of its time determination steps with subsequent sets of pseudorange measurements, evaluating corrected time integrity by comparing the first corrected time with subsequent corrected times.

39. A method in a Global Positioning System (GPS) receiver, comprising:
determining pseudorange measurements for at least four satellites;
determining an offset time between a periodic OPS event of one of the four satellites and a time of the pseudorange measurements;
sending an over-the-air message comprising the pseudorange measurements, the offset time determined, a satellite ID for the satellite of the periodic GPS event,
the over-the-air message for position computation of the GPS receiver at a remote location.

40. The method of claim 39,
determining the offset time based upon a periodic GPS event offset time and a periodic GPS event period for the corresponding periodic GPS event;
generating the over-the-air message comprising an indicator of the periodic GPS event offset time and the periodic GPS event period for the corresponding periodic GPS event.

41. A method of computing location of a GPS receiver at remote position computation equipment, comprising:
at the remote position computation equipment, receiving an over-the-air message comprising pseudorange measurements for at least four satellites, an offset time, and a satellite ID for one of the four satellites,
the offset time is a time between a periodic GPS event of the satellite corresponding to the satellite ID and a time of the pseudorange measurements;
at the remote position computation equipment, determining a minimum navigation solution residual magnitude time;
at the remote position computation equipment, determining a time correction delta based upon the period of the Periodic GPS event, the offset time, and the minimum navigation solution residual magnitude time;
at the remote position computation equipment, determining corrected time based upon the time correction delta and the minimum navigation solution residual magnitude time.

42. A method of computing location of a GPS receiver at remote position computation equipment, comprising:
at the remote position computation equipment, receiving an over-the-air message comprising pseudorange measurements for at least four satellites, a pseudorange measurement time, an offset time, and a satellite ID for one of the four satellites,
the offset time is a time between a periodic GPS event of the satellite corresponding to the satellite ID and the pseudorange measurement time;
at the remote position computation equipment, determining a time correction delta based upon the period of the Periodic GPS event, the offset time, and the pseudorange measurement time;
at the remote position computation equipment, determining corrected time based upon the time correction delta and the pseudorange measurement time.

43. A method in a Global Positioning System (GPS) receiver, comprising:
determining pseudorange measurements for at least four satellites;
determining an offset time between a periodic GPS event of one of the four satellites and the pseudorange measurement time;
determining a pseudorange measurement local time tag corresponding to a time of the pseudorange measurements;
sending an over-the-air message comprising the pseudorange measurements, and the local time tag;
the over-the-air mess age for position computation of the GPS receiver at a remote location.

44. The method of claim 43, generating the over-the-air message comprising an indicator of the periodic GPS event offset time and the periodic GPS event period for the corresponding periodic GPS event.

45. The method of claim 43, computing the pseudorange measurement local time tog that is modulo the periodic GPS event repeat time.

46. A method of computing time in a remote position computation equipment, comprising:
receiving an over-the-air message from a remote GPS receiver;
said over-the-air message containing pseudorange measurements for at least four satellites, a pseudorange measurement local time tag,
determining a minimum navigation solution residual magnitude time;
determining a time difference between the pseudorange measurement local time tag and the minimum navigation solution residual magnitude time;
determining a time correction delta based upon a modulus of the time difference and a repeat time of a periodic GPS event;
determining corrected time based upon the time correction delta and the minimum navigation solution residual magnitude time.

47. The method of claim 46, generating the over-the-air message comprising an indicator of a periodic GPS event offset time and a periodic GPS event period for the corresponding periodic GPS event.

48. A method in a Global Positioning System (GPS) receiver, comprising:

determining pseudorange measurements for at least four satellites;

determining an offset time between a periodic GPS event of one of the four satellites and a time of the pseudorange measurements;

obtaining a time correction delta based upon the offset time and the time of the pseudorange measurements;

obtaining a corrected time based upon the time correction delta and the time of the pseudorange measurements;

improving accuracy of a local real time clock based upon the corrected time.

49. The method of claim 48, improving accuracy of the local real time clock based further on a local time clock time read at the time of the pseudorange measurements.

50. The method of claim 48, receiving the corrected time in an over-the-air message from a network.

51. The method of claim 50, sending an over-the-air message containing the pseudorange measurements and a pseudorange measurement local time tag to the network, the corrected time based on the pseudorange measurement local time tag sent to the network.

52. The method of claim 50, sending the offset time determined from the GPS receiver to the network, the corrected time based on the offset time sent to the network.

53. The method of claim 48, determining an offset time between a periodic GPS event of one of the four satellites and an estimated time of the pseudorange measurements if the error of the estimated time of the pseudorange measurements is less than ½ the period of the periodic GPS event;

determining a time correction delta based upon the offset time and the estimated time of the pseudorange measurements if the error of the estimated time of the pseudorange measurements is less than ½ the period of the periodic GPS event;

obtaining a corrected time based upon the time correction delta and the estimated time of the pseudorange measurements if the error of the estimated time of the pseudorange measurements is less than ½ the period of the periodic GPS event.

54. The method of claim 53, determining a minimum navigation solution residual magnitude time if the error of the estimated time of the pseudorange measurements is not less than ½ the period of the periodic GPS event;

determining the offset time between the periodic GPS event of one of the four satellites and the minimum navigation solution residual magnitude time if the error of the estimated time of the pseudorange measurements is not less than ½ the period of the periodic GPS event;

determining the time correction delta based upon the offset time and the minimum navigation solution residual magnitude time if the error of the estimated time of the pseudorange measurements is not less than ½ the period of the periodic GPS event determining corrected time based upon the time correction delta and the minimum navigation solution residual magnitude time if the error of the estimated time of the pseudorange measurements is not less than ½ the period of the periodic GPS event.

* * * * *